US009032168B2

(12) United States Patent
Chang et al.

(10) Patent No.: US 9,032,168 B2
(45) Date of Patent: May 12, 2015

(54) MEMORY MANAGEMENT METHODS AND SYSTEMS FOR MOBILE DEVICES

(75) Inventors: Wen-Yen Chang, Taoyuan County (TW); Chih-Tsung Wu, Taoyuan County (TW); Kao-Pin Chen, Taoyuan County (TW); Ting-Lun Chen, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 184 days.

(21) Appl. No.: 13/484,917

(22) Filed: May 31, 2012

(65) Prior Publication Data

US 2013/0326168 A1    Dec. 5, 2013

(51) Int. Cl.
| | | |
|---|---|---|
| *G06F 12/00* | (2006.01) | |
| *G06F 9/48* | (2006.01) | |
| *G06F 3/06* | (2006.01) | |
| *G06F 12/02* | (2006.01) | |
| *G06F 9/50* | (2006.01) | |

(52) U.S. Cl.
CPC ............ *G06F 9/485* (2013.01); *G06F 3/0643* (2013.01); *G06F 12/0253* (2013.01); *G06F 3/0604* (2013.01); *G06F 3/0653* (2013.01); *G06F 3/0652* (2013.01); *G06F 9/5016* (2013.01)

(58) Field of Classification Search
USPC .......................... 711/100, 154, 160, 163, 166
See application file for complete search history.

(56) References Cited

U.S. PATENT DOCUMENTS

| 2002/0161932 A1 | 10/2002 | Herger et al. |
| 2010/0153675 A1 | 6/2010 | Kumar |
| 2012/0102495 A1 | 4/2012 | Gangam et al. |

FOREIGN PATENT DOCUMENTS

EP     1 406 174 A2    4/2004

OTHER PUBLICATIONS

EP Office Action issued on Dec. 17, 2013; pp. 1-7.

*Primary Examiner* — Midys Rojas
(74) *Attorney, Agent, or Firm* — CKC & Partners Co., Ltd.

(57) ABSTRACT

Memory management methods and systems for mobile devices are provided. A memory usage of a memory is monitored by a built-in memory management component of an OS of the device and a user-oriented memory management component. It is determined whether the memory usage of the memory is greater than a first threshold or a second threshold, wherein the second threshold is greater than the first threshold. When the memory usage of the memory is greater than the first threshold, a multi-level memory management is performed by the user-oriented memory management component. When the memory usage of the memory is greater than the second threshold, a primitive memory management is performed by the built-in memory management component.

28 Claims, 7 Drawing Sheets

MEMORY MANAGEMENT METHODS AND SYSTEMS FOR MOBILE DEVICES

BACKGROUND OF THE INVENTION

1. Field of the Invention

The disclosure relates generally to memory management methods and systems, and, more particularly to memory management methods and systems for mobile device that deal with the situation of low memory in accordance with taking good care of user experience.

2. Description of the Related Art

Recently, portable devices, such as handheld devices, have become more and more technically advanced and multifunctional. For example, a handheld device may have telecommunications capabilities, e-mail message capabilities, an advanced address book management system, a media playback system, and various other functions. Due to increased convenience and functions of the devices, these devices have become necessities of life.

As more and more applications become richer and number of published applications grows significantly on a mobile device which is generally coupled with limited physical memory, the situation of Out-Of-Memory (OOM) is met in higher probabilities and needs to be addressed carefully. The modern Operating System (OS) for mobile device monitors memory usage level, and as soon as the level rises above the predefined threshold, the built-in memory management component takes the actions instantly, ex., garbage collection to reclaim unused memory, kill the applications either randomly or based on some simple strategies like application size, application age or creation time.

Some inventions are uncovered to address OOM. U.S. Pat. No. 7,284,099 discloses there is provided a low memory manager allocating part of the memory for specialized applications to be held in reserve. Upon the situation of low memory comes out, reserved chunks of memory are provided to applications first for data backup and remedial steps to be carried out before the affected applications shut down. Multiple memory usage thresholds are presented in U.S. Pat. No. 6,938,254, in which when the first threshold is met, at least one of applications is requested to limit its use of memory. When the second threshold that indicates memory usage is more critical than the first threshold is hit, at least one of applications is notified to close itself. When the third threshold which means memory usage is most critical is seen, a window is prompted for user to choose at least one of applications to terminate. U.S. Pat. No. 7,827,358 prioritizes all running applications statically or dynamically, and once memory usage level goes too high, one or more applications are selected by memory management module based on priorities and come out their memory reduction operations respectively. Then API (Application Programming Interface) is invoked to each selected application to carry out memory reduction operation which could be hide-to-background, freeze-dry, restart, exit gracefully, or else.

However, to select an application to release memory or gracefully shutdown without affecting user feeling significantly is not addressed well in these disclosures. No doubt to pick up applications randomly would fail users' expectation and downgrade user experience. Likewise, pop up a window for users to choose can't deal with the conditions users are not expected being interacting with devices due to sleeping, taking a nap, or putting the device in the pocket at the memory-critical time. To select applications by priorities can't reflect weight of applications to each individual user since the applications user uses frequently are diverse indeed.

BRIEF SUMMARY OF THE INVENTION

Memory management methods and systems for mobile devices are provided.

In an embodiment of a memory management method for mobile devices, a memory usage of a memory is monitored by a built-in memory management component of an OS of the device and a user-oriented memory management component. It is determined whether the memory usage of the memory is greater than a first threshold or a second threshold, wherein the second threshold is greater than the first threshold. When the memory usage of the memory is greater than the first threshold, a multi-level memory management is performed by the user-oriented memory management component. When the memory usage of the memory is greater than the second threshold, a primitive memory management is performed by the built-in memory management component.

In an embodiment of a memory management method for mobile devices, a first level of a multi-level shutdown procedure is performed to notify a process to release memory resources. It is determined whether a memory usage of a memory is greater than a threshold. If the memory usage is greater than the threshold, a second level of the multi-level shutdown procedure is performed to dispose of codes or read-only data corresponding to the process. It is determined whether the memory usage is still greater than the threshold. If the memory usage is still greater than the threshold, a third level of the multi-level shutdown procedure is performed to notify the process to close itself within a limited time. It is determined whether the memory usage is still greater than the threshold. If the memory usage is still greater than the threshold, a fourth level of the multi-level shutdown procedure is performed to turn control to the process, and exiting self.

An embodiment of a memory management system for mobile devices includes a memory and a processing unit. The processing unit executes a built-in memory management component of an OS of the electronic device and a user-oriented memory management component to monitor a memory usage of the memory. The processing unit determines whether the memory usage of the memory is greater than a first threshold or a second threshold, wherein the second threshold is greater than the first threshold. When the memory usage of the memory is greater than the first threshold, a multi-level memory management is performed by the user-oriented memory management component. When the memory usage of the memory is greater than the second threshold, a primitive memory management is performed by the built-in memory management component.

An embodiment of a memory management system for mobile devices includes a memory and a processing unit. The processing unit performs a first level of a multi-level shutdown procedure for notifying a process to release memory resources, and determines whether a memory usage of a memory is greater than a threshold. The processing unit performs a second level of the multi-level shutdown procedure for disposing of codes or read-only data corresponding to the process if the memory usage is greater than the threshold, and determines whether the memory usage is still greater than the threshold. The processing unit performs a third level of the multi-level shutdown procedure for notifying the process to close itself within a limited time if the memory usage is still greater than the threshold, and determines whether the memory usage is still greater than the threshold. The processing unit performs a fourth level of the multi-level shutdown procedure for turning control to the process, and exiting self if the memory usage is still greater than the threshold.

In some embodiments, the multi-level memory management is performed by gathering information corresponding to processes running on the electronic device, selecting one of the processes as a loser based on the gathered information, and performing a multi-level shutdown procedure for the loser. In some embodiments, it is determined whether the memory usage of the memory is less than the first threshold after the multi-level shutdown procedure is performed. If the memory usage of the memory is not less than the first threshold, one of the processes is re-selected as a new loser based on the gathered information.

In some embodiments, the gathered information records a current foreground process, which is excluded from the processes to be selected as the loser. In some embodiments, during the selection of the loser, a white-list recording at least one specific process is further referred, wherein the specific process is excluded from the processes to be selected as the loser.

Memory management methods for mobile devices may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Memory management methods and systems for mobile devices are provided.

Figure 1:
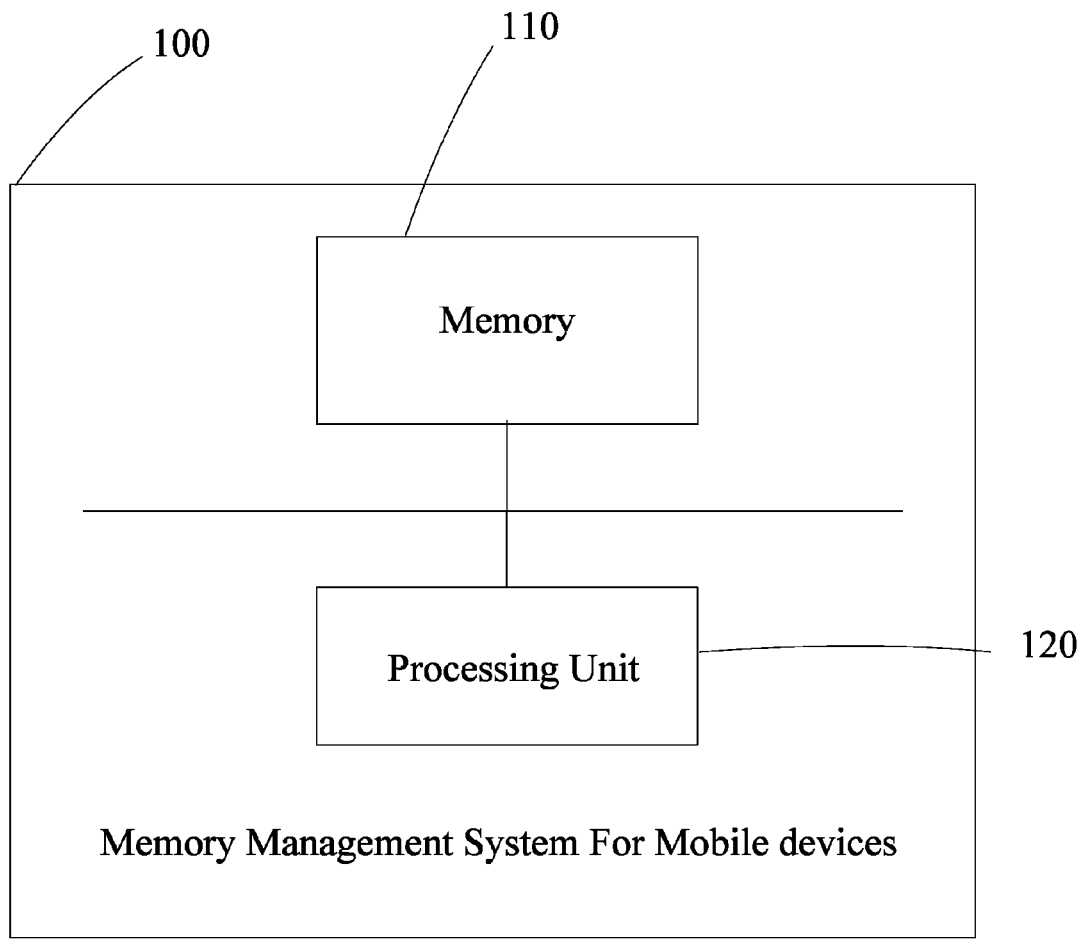
FIG. 1 is a schematic diagram illustrating an embodiment of a memory management system for mobile devices of the invention.

FIG. 1 is a schematic diagram illustrating an embodiment of a memory management system for mobile devices of the invention. The memory management system for mobile devices 100 can be used in an electronic device, such as mobile devices such as a PDA (Personal Digital Assistant), a smart phone, a mobile phone, an MID (Mobile Internet Device, MID), a Netbook, a GPS (Global Positioning System), or other handheld devices.

The memory management system for mobile devices 100 comprises a memory 110, and a processing unit 120. The memory 110 can record related codes and/or data corresponding to processes/applications running on a system of the electronic device. It is noted that, an OS may be installed on the electronic device, and a kernel of the OS is always recorded in the memory. The processing unit 120 can control related components of the memory management system for mobile devices 100, and perform the memory management methods for mobile devices of the invention, which will be discussed further in the following paragraphs. It is understood that, in some embodiments, the memory management system for mobile devices 100 can further comprise a display unit (not shown in FIG. 1). The display unit can display related figures and interfaces, and related data. It is understood that, in some embodiments, the display unit may be a screen integrated with a touch-sensitive device (not shown). The touch-sensitive device has a touch-sensitive surface comprising sensors in at least one dimension to detect contact and movement of an input tool, such as a stylus or finger on the touch-sensitive surface. That is, users can directly input related data via the display unit.

Figure 2:
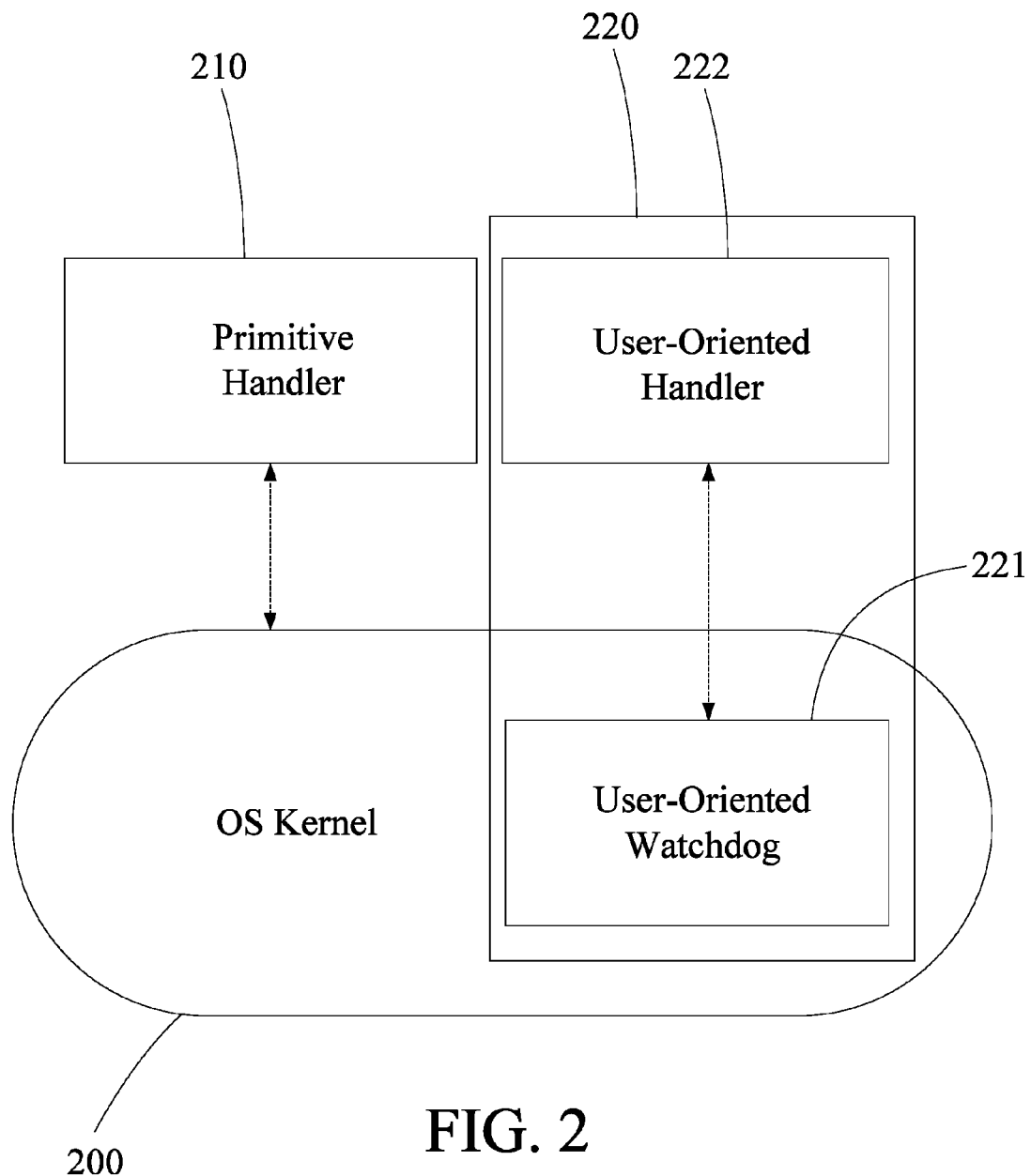
FIG. 2 is a schematic diagram illustrating an embodiment of the system architecture of the invention.

A high-level of concept of the invention is illustrated in FIG. 2. As shown in FIG. 2, a built-in primitive memory management component of the system comprises an OS kernel 200 and a built-in primitive handler 210. In some embodiments, the OS kernel 200 can monitor a memory usage of the memory. In some embodiments, the OS kernel 200 can interpret all memory activities after which number of free physical memory pages is recorded. When the memory usage is greater than a first specific threshold (second threshold in claims), or the number of free memory pages drops below a predefined threshold, the OS kernel 200 signals the primitive handler 210 by events, messages, or else. In turn the primitive handler 210 carries out a primitive memory management. It is understood that, the primitive memory management depends on whatever it's designed to do, such as selecting process/application to terminate or notifying the selected process/application to release a portion of memory. It is understood that, the primitive memory management is limited thereto, and it entirely depends on the OS design. In addition to the built-in primitive memory management component, a user-oriented memory management component 220 comprises a user-oriented watchdog 221 installed on the OS kernel 200 and a user-oriented handler 222. It is noted that, the user-oriented memory management component 220 can coexist with the primitive memory management component of the OS, and would not interfere with the primitive handler 210 at all. The user-oriented watchdog 221 can also monitor the memory usage of the memory. It is understood that, in some embodiments, the memory usage of the memory can be obtained from the OS kernel 200. The user-oriented watchdog 221 can determine whether the memory usage of the memory is greater than a first threshold. When the memory usage is greater than the first threshold, a multi-level memory management is performed by the user-oriented handler 222. It is noted that, the second threshold is greater than the first threshold. That is, the multi-level memory management can be performed prior to the primitive memory management. The details of the multi-level memory management will be discussed later.

Figure 3:
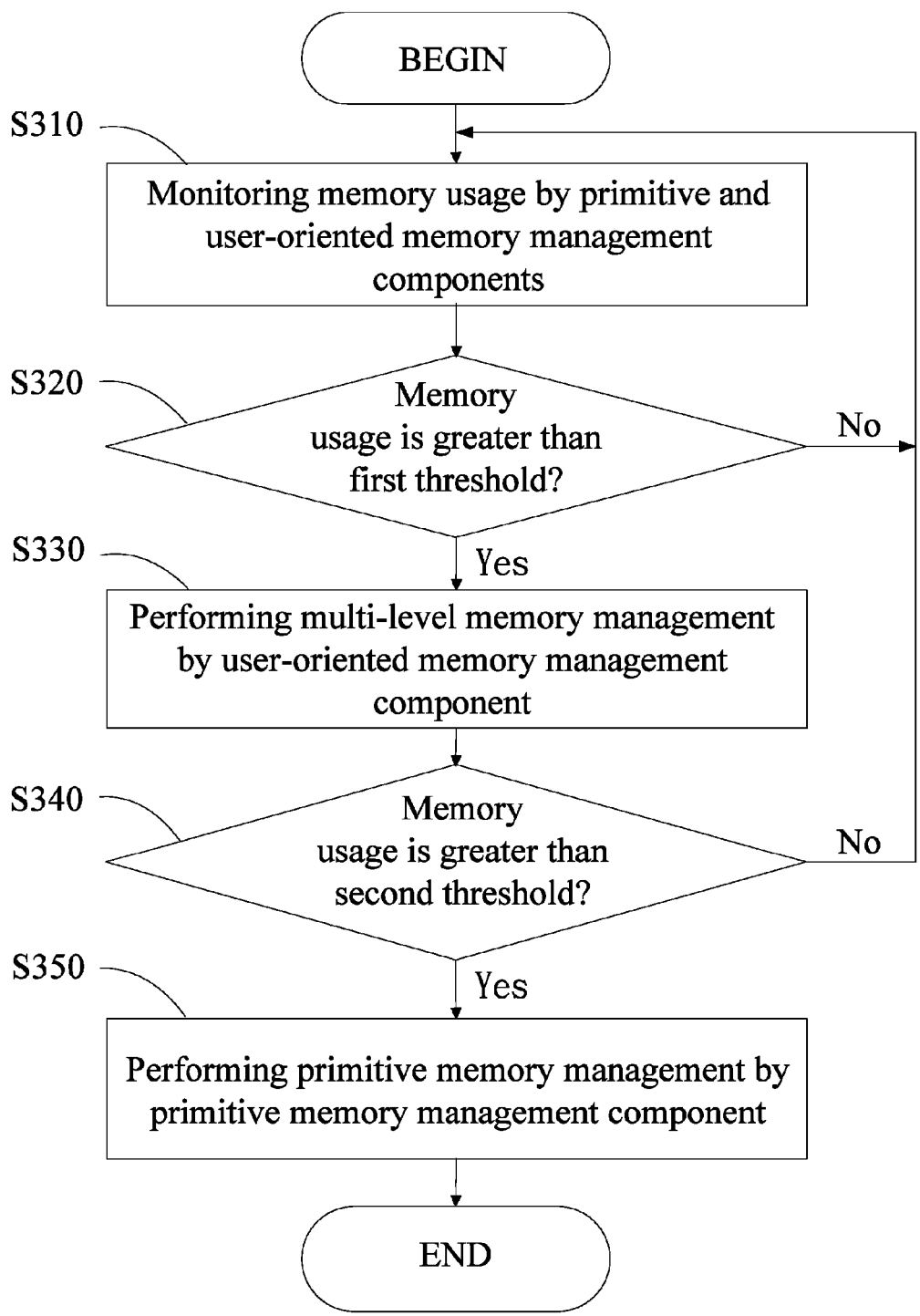
FIG. 3 is a flowchart of an embodiment of a memory management method for mobile devices of the invention.

FIG. 3 is a flowchart of an embodiment of a memory management method for mobile devices of the invention. The memory management method for mobile devices can be used in an electronic device, such as mobile devices such as a PDA, a smart phone, a mobile phone, an MID, a Netbook, a GPS, or other handheld devices.

In step S310, a memory usage of a memory is monitored by a built-in primitive memory management component of an OS of the device and/or a user-oriented memory management component. In step S320, it is determined whether the memory usage of the memory is greater than a first threshold. If the memory usage of the memory is not greater than the first threshold (No in step S320), the procedure returns to step S310. If the memory usage of the memory is greater than the first threshold (Yes in step S320), in step S330, a multi-level memory management is performed by the user-oriented memory management component. It is understood that, in some embodiments, the user-oriented memory management component comprises a user-oriented watchdog installed on a kernel of the OS and a user-oriented handler. When the memory usage of the memory is greater than the first threshold, the user-oriented watchdog will inform the user-oriented handler, and the user-oriented handler will performs the multi-level memory management when the user-oriented handler is informed by the user-oriented watchdog. The details of the multi-level memory management will be discussed later. Then, in step S340, it is determined whether the memory usage of the memory is greater than a second threshold. It is noted that, the second threshold is greater than the first threshold. If the memory usage of the memory is not greater than the second threshold (No in step S340), the procedure returns to step S310. If the memory usage of the memory is greater than the second threshold (Yes in step S340), in step S350, a primitive memory management is performed by the built-in primitive memory management component. It is understood that, the second threshold is greater than the first threshold; therefore, the multi-level memory management can be performed prior to the primitive memory management. As described, the primitive memory management depends on whatever it's designed to do, such as selecting process/application to terminate or notifying the selected process/application to release a portion of memory. It is understood that, the primitive memory management is limited thereto, and it entirely depends on the OS design.

Figure 4:
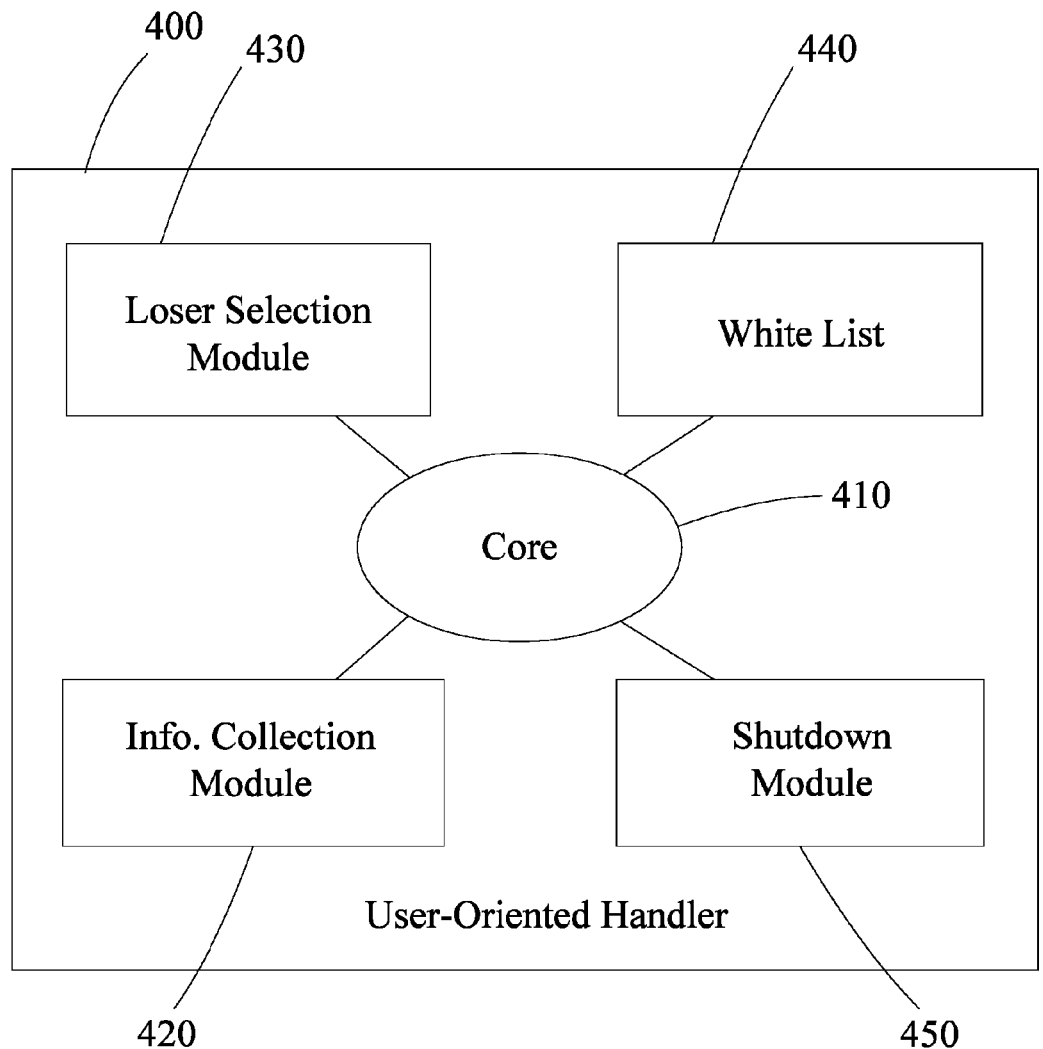
FIG. 4 is a schematic diagram illustrating an embodiment of a user-oriented handler of the invention.

FIG. 4 is a schematic diagram illustrating an embodiment of a user-oriented handler of the invention. As shown in FIG. 4, the user-oriented handler 400 comprises a core 410, an information collection module 420, a loser selection module 430, a white list 440, and a shutdown module 450. The core 410 is the brain controlling whole action logic upon low memory situation (the memory usage is greater than the first threshold). The core 410 initiates necessary data structures, installs the user-oriented watchdog on the OS kernel, setups information markers in the OS kernel via the information collection module 420, and then blocks itself to wait for notification from the user-oriented watchdog upon low memory situation (the memory usage is greater than the first threshold) is detected.

The information collection module 420 can gather related information corresponding processes/applications from the OS kernel. It is understood that, in some embodiments, the gathered information comprises a number of committed pages represents usage of private data, a number of reserved pages tells current usage of virtual memory, a least recently used (LRU) time represents how long ago the process/application user was using, used frequency (Hotspot) tells how often the process/application user stops by in a sampled period, generally given couple minutes to hours, current foreground process/application user is interacting with, and/or others. It is understood that, above information is only example of the embodiment, and the invention is not limited thereto. It is noted that, generally, two types of information can be gathered, wherein one is sampled and the other is live. The sampled data, such as LRU, Hotspot, and others can be computed periodically in a long timer-interrupt interval. It is noted that, simply couples of instructions can be added to record necessary information, such as current running process/application, and the overhead for sampling is rather small. Sampled data is considered and examined to represent how much user like the process/application particularly. Live data is collected right at the timeframe the low memory situation comes out. It is noted that, in some embodiments, processor interrupts must be masked prior to gather live data since preemptive execution always has a chance of causing unexpected exceptions due to invalid access to stale objects in memory. In some embodiments, virtual memory (VM) usage of a process/application could be simply calculated by walking through all memory pages in process space or query VM allocation marker indicating the current VM allocation baseline. With respect to physical memory usage, page tables could be gone through to sum up how many pages can be translated by Memory Management Unit (MMU).

The white list 440 defines which processes/applications should never be taken as losers. That is, the process/application recorded in the white list 440 is excluded from the processes/applications to be selected as the loser. The processes/applications can be added or deleted dynamically. It is understood that, in some embodiments, each process/application can be expressed in a simpler way such as hashed double word instead of long string-formatted name. The loser selection module 430 can weight all processes/applications running on the system based on gathered information and user experience, and select at least one loser among the processes/applications on place. It is understood that, in some embodiments, to weigh each factor regarding user experience, LRU and Hotspot are supposed to be taken heavier than the others. To keep the processes/applications users like and use most frequently alive will seal users' good feeling and attractiveness on system in terms of low memory condition. The shutdown module 450 can perform a multi-leveled shutdown procedure for a loser when the loser is selected from the processes/applications running on the system. The multi-leveled shutdown procedure will be discussed later.

Figure 5:
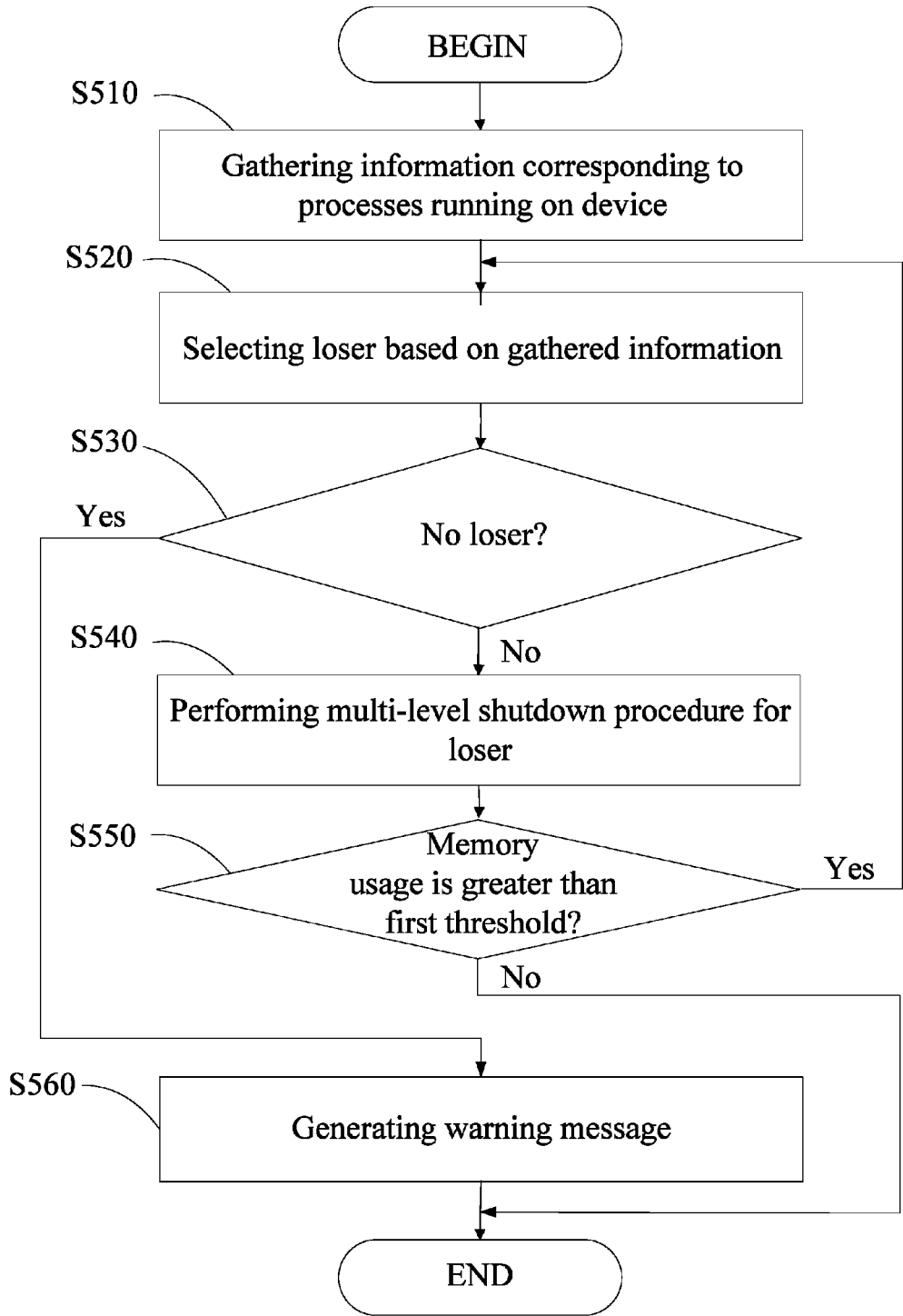
FIG. 5 is a flowchart of an embodiment of a method of multi-level memory management of the invention.

FIG. 5 is a flowchart of an embodiment of a method of multi-level memory management of the invention. It is noted that, the multi-level memory management can be performed upon the notification sent by the user-oriented watchdog when the memory usage is greater than the first threshold.

In step S510, related information corresponding to processes/applications running on the system is gathered. As described, two types of information can be gathered, wherein one is sampled and the other is live. In some embodiments, the gathered information can comprise a VM usage, a physical memory usage, a LRU time, and/or a Hotspot (used frequency) of the respective process/application. In step S520, one of the processes can be selected as a loser based on the gathered information. It is understood that, in some embodiments, to keep the processes/applications users like and use most frequently alive will seal users' good feeling and attractiveness on system in terms of low memory condition. It is understood that, in some embodiments, the processes/applications defined in the white list or being on the foreground interacting with user (current foreground process) are bypassed out of this selection. An embodiment of loser selection will be discussed in FIG. 6. In step S530, it is determined whether a loser can be selected. If loser cannot be selected due to, for example, all existing processes/applications are vital to users (Yes in step S530), in step S560, a warning message is generated, and/or popped up in a display unit. It is noted that, if loser cannot be selected, the built-in primitive memory management component of the OS can be counted on as final outpost to deal with such low memory situation (in step S350) even it would hurt user experience a lot. If a loser is selected (No in step S530), in step S540, a multi-level shutdown procedure for the loser is performed. The multi-level shutdown procedure will be discussed in FIG. 7. After the multi-level shutdown procedure for the loser, in step S550, it is determined whether the memory usage of the memory is greater than the first threshold after the multi-level shutdown procedure is performed. If the memory usage of the memory is not greater than the first threshold (No in step S550), the procedure is complete. If the memory usage of the memory is still greater than the first threshold (Yes in step S550), the procedure returns to step S520, another process is re-selected as a new loser based on the gathered information, and a multi-level shutdown procedure for the new loser is performed. The loser selection and multi-level shutdown procedure for the selected loser are repeated until the memory usage is not greater than the first threshold or no loser can be selected.

Figure 6:
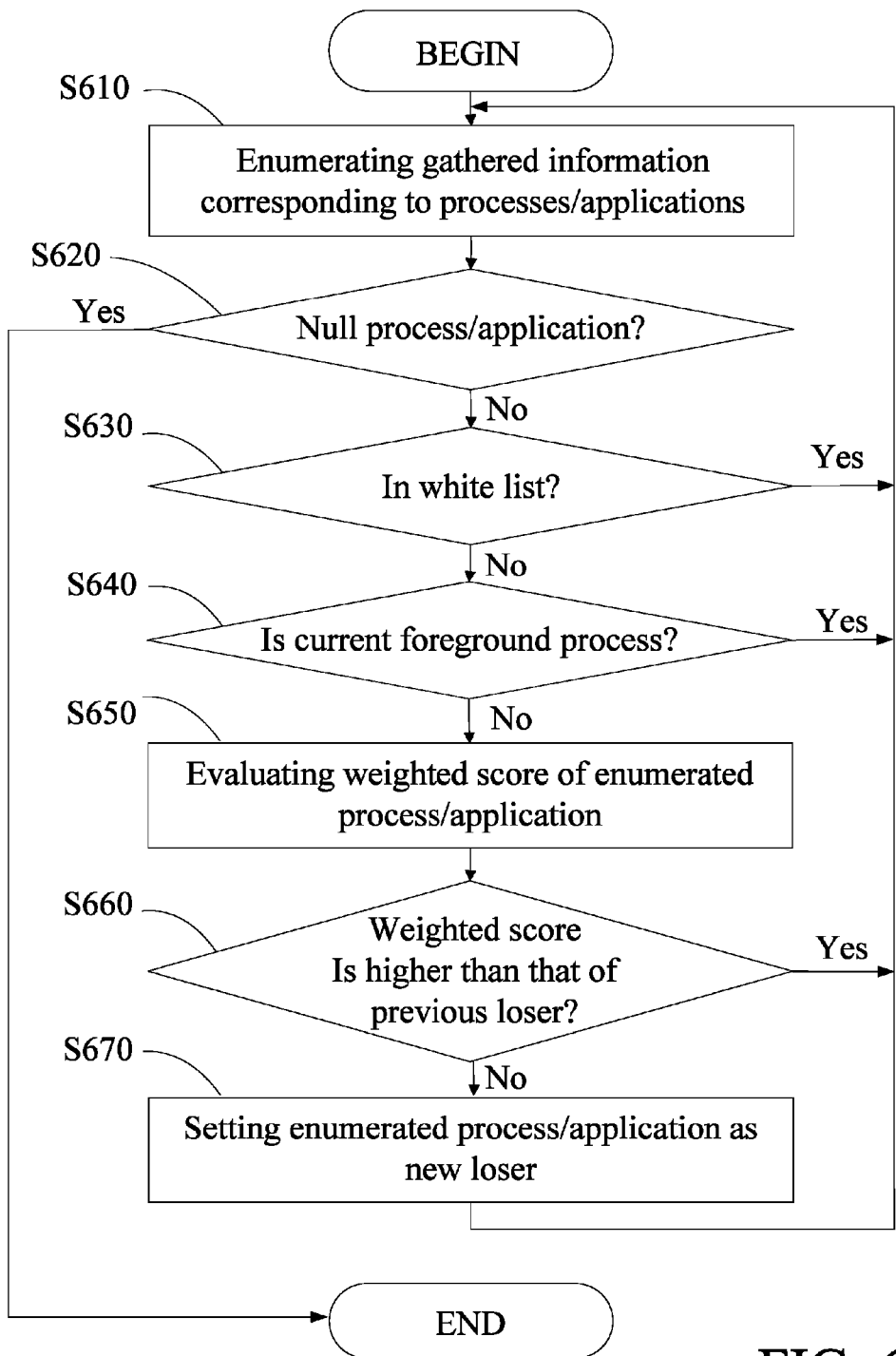
FIG. 6 is a flowchart of an embodiment of a method of loser selection of the invention.

FIG. 6 is a flowchart of an embodiment of a method of loser selection of the invention. It is noted that, the selected loser is initiated to null at first. In step S610, the respective gathered information corresponding to processes/applications is enumerated. In step S620, it is determined whether all processes/applications are enumerated and inspected. If all processes/applications have been done of enumeration and inspection (Yes in step S620), the procedure is complete and the final best loser is given. If there is still process/application to be inspected (No in step S620), in step S630, the enumerated process/application is examined whether it is in the while list. If the enumerated process/application is in the white list (Yes in step S630), the procedure returns to step S610, and the gathered information corresponding to another process/application is enumerated. If the enumerated process/application is not in the white list (No in step S630), it is determined whether the enumerated process/application is the current foreground process/application that user is interacting with. If the enumerated process/application is the current foreground process/application (Yes in step S640), the procedure returns to step S610, and the gathered information corresponding to another process/application is enumerated. If the enumerated process/application is not the current foreground process/application (No in step S640), in step S650, a weighted score of the enumerated process/application is evaluated, for example, according to a formula of w1X1+w2X2+ . . . +wnXn, wherein w1, w2, . . . , and wn represent the weights for respective factor (gathered information), and X1, X2, . . . , and Xn are the normalized factors(gathered information). It is noted that, the weights for respective factors can be various, and may be depended on different applications and requirements. In step S660, the weighted score corresponding to the enumerated process/application is compared with that of the previous selected loser. It is understood that, in some embodiments, higher score means the enumerated process/application is more valuable to user than the previous selected loser. On the contrary, lower score recommends the enumerated process/application should be taken as new selected loser who will be compared to next enumerated process/application. If the weighted score corresponding to the enumerated process/application is higher than that of the previous selected loser (Yes in step S660), the procedure returns to step S610, and the gathered information corresponding to another process/application is enumerated. If the weighted score corresponding to the enumerated process/application is not higher than that of the previous selected loser (No in step S660), in step S670, the enumerated process/application is set as the new selected loser, and the procedure returns to step S610, until all processes/applications are enumerated. It is noted that, the best loser is pointed out and handed over to the shutdown module.

Figure 7:
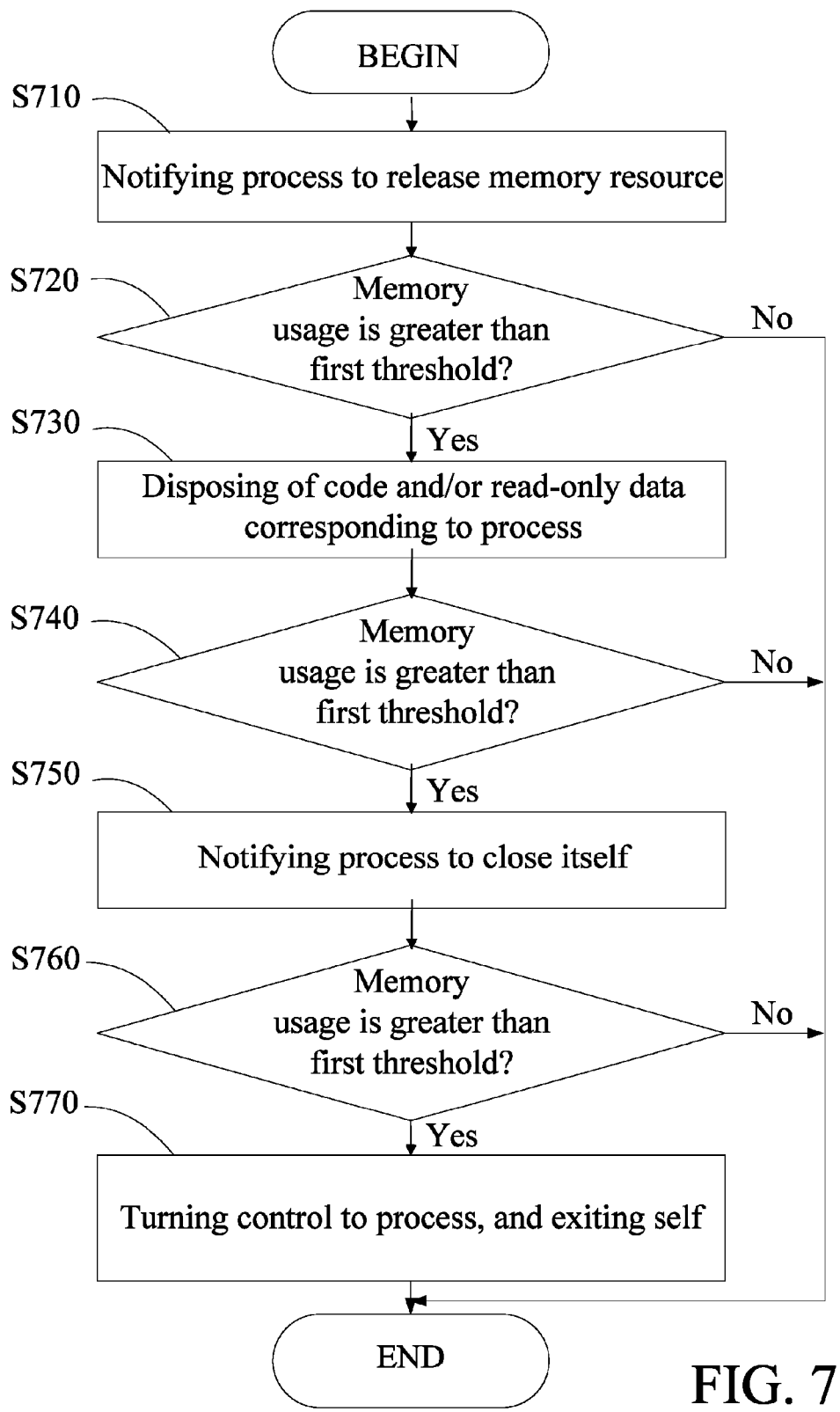
FIG. 7 is a flowchart of an embodiment of a multi-level shutdown procedure of the invention.

FIG. 7 is a flowchart of an embodiment of a multi-level shutdown procedure of the invention. In step S710, a first level of the multi-level shutdown procedure is performed, in which a process/application, such as the loser selected by the loser selection module, is notified via an event or message to release memory resources. It is understood that, the notification can indicate low memory condition occurs, and it's supposed to commence memory reduction operations instantly like release unused memory, close resources as many as possible for UI representation, and others. In step S720, it is determined whether the memory usage of the memory is greater than the first threshold. If the memory usage is not greater than the first threshold (No in step S720), the procedure is complete. If the memory usage is greater than the first threshold (Yes in step S720), in step S730, a second level of the multi-level shutdown procedure is performed to dispose or page out of codes or read-only data/sections corresponding to the process/application as much as possible. It is understood that, to page out those data gives the pages hold in paging pool back to the OS kernel and could be re-allocated for other processes/applications needing it immediately. In step S740, it is determined whether the memory usage of the memory is greater than the first threshold. If the memory usage is not greater than the first threshold (No in step S740), the procedure is complete. If the memory usage is still greater than the first threshold (Yes in step S740), in step S750, a third level of the multi-level shutdown procedure is performed to notify the process to close itself within a limited time, usually couple seconds. It is noted that, this step introduces graceful shutdown, so that other processes/applications rely on the loser would not act weirdly after the loser is closed. Then, in step S760, it is determined whether the memory usage of the memory is greater than the first threshold. If the memory usage is not greater than the first threshold (No in step S760), the procedure is complete. If the memory usage is still greater than the first threshold (Yes in step S760), in step S770, a fourth level of the multi-level shutdown procedure is performed to turn control to the process/application, and exit self. It is understood that, since the process/application might refuse or neglect the close-request, the fourth level of the multi-level shutdown procedure will turn the shutdown module itself to the loser temporarily, and then exits self to shut the loser down safely. There are essential drawbacks in some OS designs when terminating the loser from another process/application since some threads belonging to the loser are waiting for exit signal to do something like cleaning up garbage, disconnecting network connections, and etc. To exit self can always ensure both of exit and termination jobs are done. As long as the memory usage still resides over the threshold (Yes in step S550), the core will repeat triggering the loser selection module to point out next loser (step S520), and the new loser is then passed to the shutdown module to enforce four levels of memory reduction and instance termination until no more losers can be aimed.

Therefore, the memory management methods and systems for mobile devices can deal with the situation of low memory in accordance with taking good care of user experience. Besides of the primitive memory management component of OS which sees to the out-of-memory condition, the invention is functional independently without alteration in or interference with any of OS operations and decisions. In the invention, a user-oriented memory management method is proposed to pick up a loser among running processes/applications, and then impose multi-leveled memory reduction operations and process/application termination on the selected loser instead of simply closing it. The disclosed principle is to keep of most importance processes/applications to users alive concerning about out-of-memory takes place, and instruct the selected losers to give back memory as much as possible to bring the system back to good memory usage state.

Memory management methods for mobile devices, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A memory management method for mobile devices for use in an electronic device, comprising:
   monitoring a memory usage of a memory by a built-in memory management component of an OS (Operating System) of the electronic device and a user-oriented memory management component;
   determining whether the memory usage of the memory is greater than a first threshold; and
   performing a multi-level memory management in response to the memory usage of the memory being greater than the first threshold,
   wherein the multi-level memory management comprises a step of releasing memory resources corresponding to a process without closing the process.

2. The method of claim 1, wherein the user-oriented memory management component comprises a user-oriented watchdog installed on a kernel of the OS and a user-oriented handler, when the memory usage of the memory is greater than the first threshold, the method further comprises a step of informing the user-oriented handler by the user-oriented watchdog, and performing the mufti-level memory management by the user-oriented handler when the user-oriented handler is informed by the user-oriented watchdog.

3. The method of claim 1, wherein the multi-level memory management comprises the steps of:
   gathering information corresponding to processes running on the electronic device;
   selecting one of the processes as a loser based on the gathered information; and
   performing a multi-level shutdown procedure for the loser.

4. The method of claim 3, wherein the multi-level memory management further comprises:
   determining whether a loser is selected; and
   if no loser is selected, a warning message is generated.

5. The method of claim 3, wherein the multi-level memory management further comprises:
   determining whether the memory usage of the memory is less than the first threshold after the multi-level shutdown procedure is performed; and
   if the memory usage of the memory is not less than the first threshold, re-selecting one of the processes as a loser based on the gathered information.

6. The method of claim 3, wherein the gathered information comprises a virtual memory usage, a physical memory usage, a least recently used (LRU) time, or a used frequency of the respective process.

7. The method of claim 3, wherein the gathered information further records a current foreground process, which is excluded from the processes to be selected as the loser.

8. The method of claim 3, wherein during the selection of the loser, a white-list recording at least one specific process is further referred, wherein the specific process is excluded from the processes to be selected as the loser.

9. The method of claim 3, wherein the multi-level shutdown procedure for the loser comprises a first level of the multi-level shutdown procedure for notifying the loser to release memory resources.

10. The method of claim 9, wherein the multi-level shutdown procedure for the loser further comprises the steps of:
    determining whether the memory usage is still greater than the first threshold; and
    if the memory usage is still greater than the first threshold, performing a second level of the multi-level shutdown procedure for disposing of codes or read-only data corresponding to the loser.

11. The method of claim 10, wherein the multi-level shutdown procedure for the loser further comprises the steps of:
    determining whether the memory usage is still greater than the first threshold; and
    if the memory usage is still greater than the first threshold, performing a third level of the multi-level shutdown procedure for notifying the loser to close itself within a limited time.

12. The method of claim 11, wherein the multi-level shutdown procedure for the loser further comprises the steps of:
    determining whether the memory usage is still greater than the first threshold; and
    if the memory usage is still greater than the first threshold, performing a fourth level of the multi-level shutdown procedure for turning control to the loser, and exiting self.

13. A memory management method for mobile devices for use in an electronic device, comprising:
    performing a first level of a multi-level shutdown procedure for notifying a process to release memory resources;
    determining whether a memory usage of a memory is greater than a threshold;
    if the memory usage is greater than the threshold, performing a second level of the multi-level shutdown procedure for disposing of codes or read-only data corresponding to the process;
    determining whether the memory usage is still greater than the threshold;
    if the memory usage is still greater than the threshold, performing a third level of the multi-level shutdown procedure for notifying the process to dose itself within a limited time;
    determining whether the memory usage is still greater than the threshold; and
    if the memory usage is still greater than the threshold, performing a fourth level of the multi-level shutdown procedure for turning control to the process, and exiting self.

14. A memory management system for mobile devices for use in an electronic device, comprising:
    a memory; and
    a processing unit executing a built-in memory management component of an OS (Operating System) of the electronic device and a user-oriented memory management component to monitor a memory usage of the memory, determining whether the memory usage of the memory is greater than a first threshold, and performing a multi-level memory management in response to the memory usage of the memory being greater than the first threshold, wherein the multi-level memory management comprises a step of releasing memory resources corresponding to a process without closing the process.

15. The system of claim 14, wherein the user-oriented memory management component comprises a user-oriented watchdog installed on a kernel of the OS and a user-oriented handler, when the memory usage of the memory is greater than the first threshold, the user-oriented watchdog informs the user-oriented handler, and the user-oriented handler performs the multi-level memory management when the user-oriented handler is informed by the user-oriented watchdog.

16. The system of claim 14, wherein the processing unit performs the multi-level memory management by gathering information corresponding to processes running on the electronic device, selecting one of the processes as a loser based on the gathered information, and performing a multi-level shutdown procedure for the loser.

17. The system of claim 16, wherein during the multi-level memory management, the processing unit further determines whether a loser is selected, and generates a warning message if no loser is selected.

18. The system of claim 16, wherein after the multi-level shutdown procedure is performed, the processing unit further determines whether the memory usage of the memory is less than the first threshold, and re-selects one of the processes as a loser based on the gathered information if the memory usage of the memory is not less than the first threshold.

19. The system of claim 16, wherein the gathered information comprises a virtual memory usage, a physical memory usage, a least recently used (LRU) time, or a used frequency of the respective process.

20. The system of claim 16, wherein the gathered information further records a current foreground process, the processing unit excludes the current foreground process from the processes to be selected as the loser.

21. The system of claim 16, wherein during the selection of the loser, the processing unit further refers a white-list recording at least one specific process, which is excluded from the processes to be selected as the loser.

22. The system of claim 16, wherein in the multi-level shutdown procedure for the loser, the processing unit notifies the loser to release memory resources in a first level.

23. The system of claim 22, wherein the processing unit further determines whether the memory usage is still greater than the first threshold, and if the memory usage is still greater than the first threshold, disposes of codes or read-only data corresponding to the loser in a second level.

24. The system of claim 23, wherein the processing unit further determines whether the memory usage is still greater than the first threshold, and if the memory usage is still greater than the first threshold, notifies the loser to close itself within a limited time in a third level.

25. The system of claim 24, wherein the processing unit further determines whether the memory usage is still greater than the first threshold, and if the memory usage is still greater than the first threshold, turns control to the loser, and exits self in a fourth level.

26. A memory management system for mobile devices for use in an electronic device, comprising:
a memory; and
a processing unit performing a first level of a multi-level shutdown procedure for notifying a process to release memory resources, determining whether a memory usage of a memory is greater than a threshold, and performing a second level of the multi-level shutdown procedure for disposing of codes or read-only data corresponding to the process if the memory usage is greater than the threshold, determining whether the memory usage is still greater than the threshold, and performing a third level of the multi-level shutdown procedure for notifying the process to close itself within a limited time if the memory usage is still greater than the threshold, and determining whether the memory usage is still greater than the threshold, and performing a fourth level of the multi-level shutdown procedure for turning control to the process, and exiting self if the memory usage is still greater than the threshold.

27. A non-transitory machine-readable storage medium comprising a computer program, which, when executed, causes a device to perform a memory management method for mobile devices, wherein the method comprises:
monitoring a memory usage of a memory by a bunt-in memory management component of an OS (Operating System) of the device and a user-oriented memory management component;
determining whether the memory usage of the memory is greater than a first threshold; and
performing a multi-level memory management in response to the memory usage of the memory being greater than the first threshold,
wherein the multi-level memory management comprises a step of releasing memory resources corresponding to a process without closing the process.

28. A non-transitory machine-readable storage medium comprising a computer program, which, when executed, causes a device to perform a memory management method for mobile devices, wherein the method comprises:
performing a first level of a multi-level shutdown procedure for notifying a process to release memory resources;
determining whether a memory usage of a memory is greater than a threshold;
if the memory usage is greater than the threshold, performing a second level of the multi-level shutdown procedure for disposing of codes or read-only data corresponding to the process;
determining whether the memory usage is still greater than the threshold;
if the memory usage is still greater than the threshold, performing a third level of the multi-level shutdown procedure for notifying the process to close itself within a limited time;
determining whether the memory usage is still greater than the threshold; and
if the memory usage is still greater than the threshold, performing a fourth level of the multi-level shutdown procedure for turning control to the process, and exiting self.

* * * * *